UNITED STATES PATENT OFFICE.

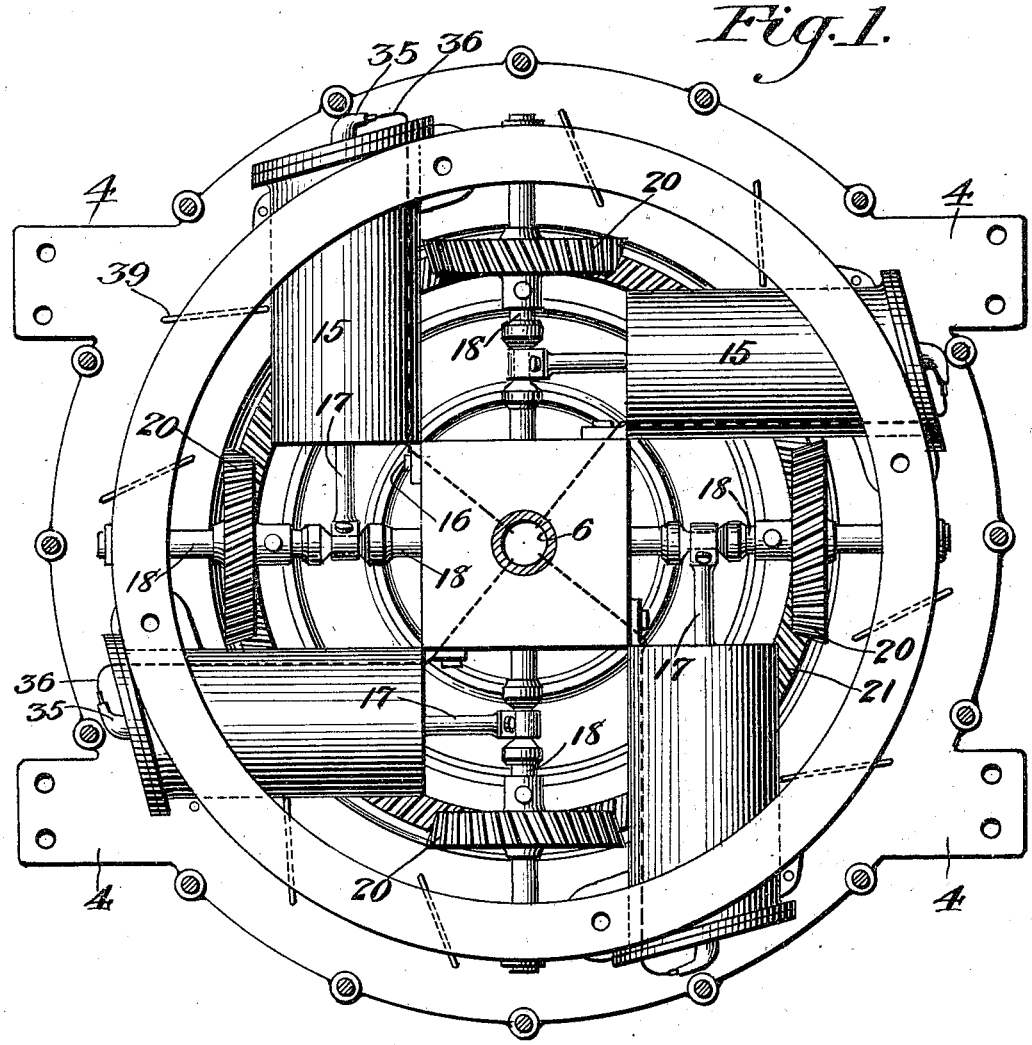

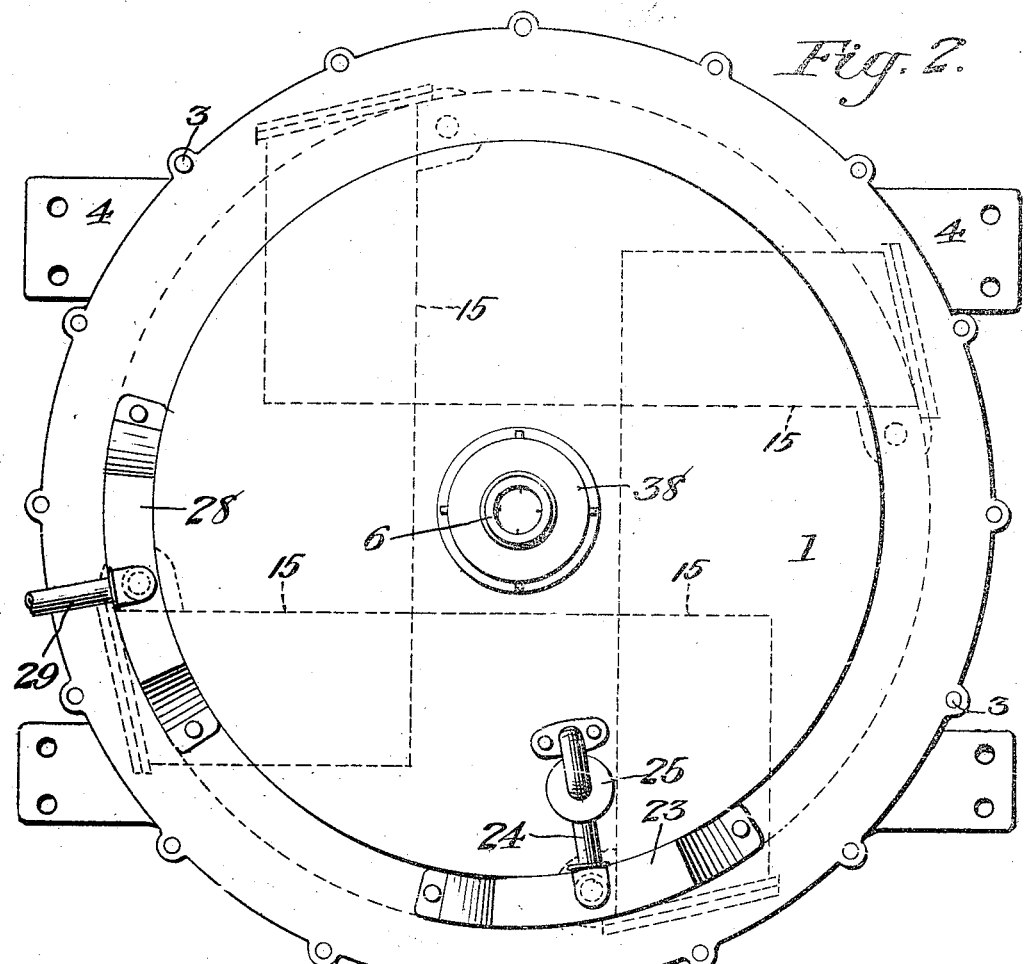
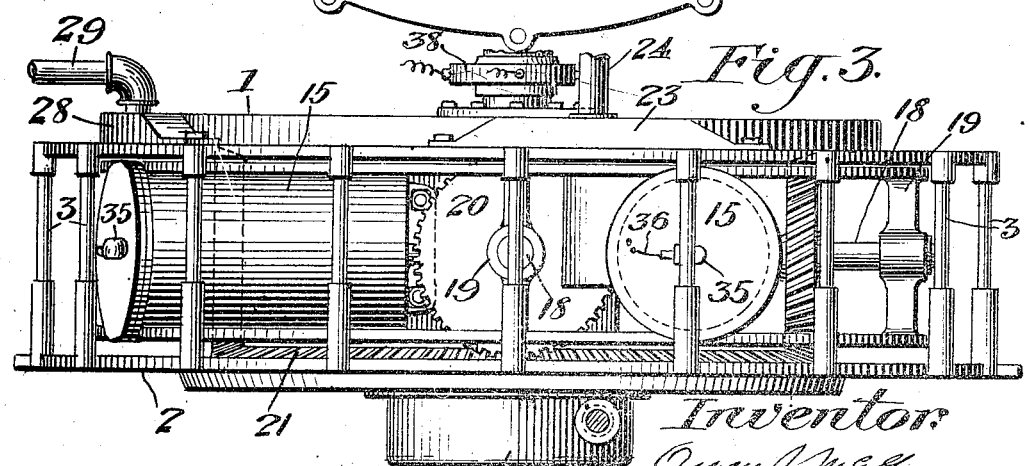

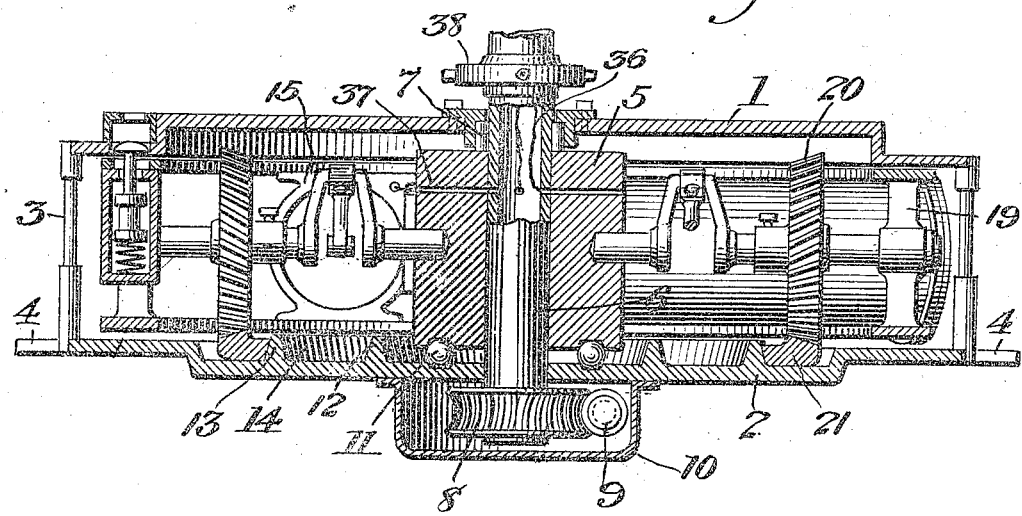
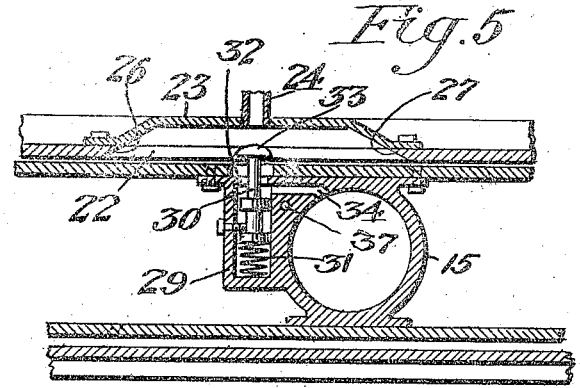

OWEN J. McGANN, OF CARROLLTON, OHIO, ASSIGNOR OF ONE-HALF TO GEORGE SINCLAIR, OF HANOVERTON, OHIO.

ROTARY INTERNAL-COMBUSTION ENGINE.

1,272,975.

Specification of Letters Patent.   Patented July 16, 1918.

Application filed March 21, 1918. Serial No. 223,717.

*To all whom it may concern:*

Be it known that I, OWEN J. McGANN, a citizen of the United States, residing at Carrollton, in the county of Carroll and State of Ohio, have invented certain new and useful Improvements in Rotary Internal-Combustion Engines; and I do hereby declare the following to be a full, clear, and exact description of the invention, such as will enable others skilled in the art to which it appertains to make and use the same.

This invention relates to an internal combustion engine of the rotary type, and is in the nature of an improvement on the engine illustrated and claimed in my application, Serial No. 142,665, filed January 16, 1917.

An object of the invention resides in the provision of a rotary engine wherein the valves will be automatically opened during the movement of the rotor, to permit the passage of live gases to the cylinders and the exhaust of burnt gases therefrom. It is a further object of the invention to so construct these valves and locate them with relation to the rotor casing that the valves will be firmly held closed during the combustion and compression strokes of the pistons.

Furthermore, an object of the invention resides in providing the cylinders which are carried by the rotor and move therewith, with spark plugs which are connected to the distributer by conductors, in a novel manner.

It is a further object of the invention to construct the engine of relatively few parts, and in such manner that its operation, as well as its cooling will be successfully carried out.

With these and other objects in view, such as will appear as my description progresses, my invention comprises the arrangement and combination of parts as set forth in and falling within the scope of the appended claims.

In the drawing:

Figure 1 is a horizontal sectional view showing the rotor complete, but showing the top plate of the casing removed;

Fig. 2 is a top plan view, with the top plate in place;

Fig. 3 is a side elevation;

Fig. 4 is a vertical sectional view, and

Fig. 5 is a similar view disclosing the manner in which one of the valves is associated with the adjacent cylinder.

In the drawing I have illustrated one embodiment of my invention, which includes a casing. This casing comprises an upper plate 1 and a lower plate 2, the plates being held in proper spaced relation by bolts 3 which are engaged with and extend between the peripheries of the plates. These plates are further provided with projections 4, by means of which the engine may be bolted to a suitable support. A rotor is mounted within the casing and includes a central body portion 5 through which a hollow shaft 6 extends, the shaft and body portion being rigidly secured together in any suitable manner. This shaft 6 extends through the upper plate 1 and operates between roller bearings 7, while at its lower end it extends through the lower plate 2 and is provided with a worm gear 8 with which a worm 9 meshes, the worm gear and worm being located within a suitable protector 10. When the shaft 6 is rotated in a manner which will later appear, the worm 9 may be used to transmit the power for any suitable purpose. The central body portion 5 of the rotor operates on ball bearings 11, which latter are located in races in the body portion and in the lower plate 2. The lower plate is provided with a pair of annular flanges 12 and 13, the innermost flange 12 forming an oil well in which the bearings 11 operate and forming with the outer flange 13 an oil well 14, in which the crank shafts, later to be described, dip. A pair of concentric rings 15 are located within the casing. Between these rings a plurality of cylinders 15 are located, the cylinders being arranged tangentially to the shaft 6, and extending from points beyond the peripheries of the rings to the body portion 5 to which latter they are secured by suitable means, such as bolts 16. The connecting rods 17 of the pistons which operate within these cylinders, are connected to crank shafts 18, which latter extend radially of the shaft 6, each being supported at one end within the body portion 5 and at its other end in a suitable supporting bearing 19, which extends between the rings 15. Helical gears 20 are secured to these crank shafts 18 and intermesh with a rack 21 which is secured to the upper face of the lower plate 2 of the casing.

Thus, when the crank shafts 18 are actuated by the pistons, the helical gears will be rotated and consequently, because of their engagement with the rack 21, will cause the rotation of the entire rotor. As the crank shafts are actuated, they will dip into the oil well 14, so that a perfect lubrication of the bearings will be obtained.

In order that the cylinders may be supplied with gas during the rotation of the rotor, the upper plate is provided with an elongated opening 22 which is covered by a housing 23, to which housing an intake manifold 24, extending from a carbureter 25, is connected. The edges of the opening 22 are beveled, forming cams 26 and 27, which are for the purpose of permitting the valves to open gradually and for depressing the valves so as to close the same.

At another location on the upper plate a second arcuate opening is formed, which opening is covered by a housing 28, with which the exhaust manifold 29 communicates. The edges of this opening are likewise cam shaped so as to actuate valves in a similar manner to that already described. Each of the cylinder castings is provided with a chamber 29 in which is located a valve 30. This valve is normally pressed upwardly to an open position by means of a spring 31, but is adapted to close when it is forced upon its seat 32. The upper end 33 of each of these valves is rounded so as to coöperate with the cams 26 and 27. The cylinder castings are further provided with ports 34, which are controlled by the above referred to valves.

When one of the valves 30 is traveling from the exhaust housing 28 to the intake housing 23, for instance, the valve will be held in its closed position, with its head 33 seated, by its contact with the under surface of the upper plate 1. When, however, the valve reaches the intake housing, the spring 31 will force the valve upwardly on the cam surface 26 and thus open the valve, so that during the travel of the valve from one end of the opening 22 to the other, the piston within the adjacent cylinder will be permitted to draw in the gas. When the valve head 33 engages the cam surface 22, the valve is again closed, and during the compression and firing strokes of the piston it is held closed by the engagement of the head 33 with the lower surface of the plate 1 between the intake housing and the cam housings. It will, of course, be obvious that as each cylinder passes the intake housing 22 the gas will be drawn into the same and as it moves with the rotation of the rotor, the gas will be compressed and subsequently fired. Thus, as the valve moves beneath the exhaust housing, the burnt gases will be exhausted. Thus, the rotor will be given four impulses during each rotation.

In order that the compressed gas may be ignited, I have provided a spark plug 35 for each of the cylinders, the plug being located in the end of the cylinder. An electrical conductor 36 extends from the spark plug through a port 36 in the cylinder casting and thence through a bore 37 in the body portion of the rotor. The conductor then passes upwardly through the hollow shaft 6 and to a suitable distributer 38, by means of which the conductor is connected to the remainder of the ignition system. It is, of course, to be understood that this distributer is stationary, but permits the circuit to remain unbroken at this point.

Extending upwardly between the upper and lower rings 15 are a plurality of fins 39, which establish a circulation of air through the rotor and thus successfully cool the cylinders.

What I claim is:

1. In an internal combustion engine, the combination with a casing, of a shaft rotatable therein, a rotor mounted on said shaft and including a central body portion, a pair of spaced annular elements, cylinders arranged tangentially with respect to the shaft and supported by the annular elements and body portion, crank shafts extending radially with respect to the first mentioned shaft and supported by the annular elements and by the body portion, and gearing between the crank shafts and the casing.

2. In an internal combustion engine, the combination with a casing, of a shaft rotatable therein, a rotor mounted on said shaft and including a central body portion, a pair of spaced annular elements, cylinders arranged tangentially with respect to the shaft and supported by the annular elements and body portion, crank shafts extending radially with respect to the first mentioned shaft and supported by the annular elements and by the body portion, gearing between the crank shafts and the casing, spark plugs carried by the outer ends of the cylinders, a distributer associated with the first mentioned shaft, and electrical conductors extending from said distributer through said shaft and through the cylinder castings to the spark plugs.

3. In an internal combustion engine, the combination with a rotary shaft, of a rotor secured thereto, said rotor including explosion cylinders, electrodes carried by the outer ends of said cylinders, a distributer associated with the shaft and electrical conductors extending from said distributer through the shafts and through the cylinder castings to the electrodes.

4. In an internal combustion engine, the combination with a pair of spaced plates, of a shaft rotatably mounted in said plates, a rotor secured to the shaft and including a plurality of crank shafts, pressure operated pistons for actuating the crank shafts, gear connections between said crank shafts and one of said plates, annular elements arranged co-axially with the first mentioned shafts, and bearings between the elements for the crank shafts, said elements being arranged to support the cylinders.

5. In an internal combustion engine, the combination with a casing including upper and lower plates, of a rotor mounted therein and carrying a plurality of explosion cylinders, one of said plates having gas inlet and exhaust openings, each cylinder having a bore adapted to move into communication with said openings; a valve associated with each cylinder to control the bore therein, and means for unseating the valve to open the bore as the cylinders pass the inlet and exhaust openings, the said valve being reseated automatically by the plate.

In testimony whereof I affix my signature.

OWEN J. McGANN.